US007583473B2

(12) United States Patent
Bolasna et al.

(10) Patent No.: US 7,583,473 B2
(45) Date of Patent: Sep. 1, 2009

(54) AIR BEARING WITH BOTH LOW ALTITUDE AND SPEED SENSITIVITIES

(75) Inventors: Sanford A. Bolasna, San Jose, CA (US); Lee K. Dorius, San Jose, CA (US); Weidong Huang, San Jose, CA (US); Robert N. Payne, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 369 days.

(21) Appl. No.: 11/495,070

(22) Filed: Jul. 28, 2006

(65) Prior Publication Data

US 2008/0024924 A1 Jan. 31, 2008

(51) Int. Cl.
*G11B 5/60* (2006.01)

(52) U.S. Cl. .................................................. 360/236.2

(58) Field of Classification Search ............. 360/235.9, 360/236, 236.1, 236.2, 236.3, 235.4, 235.8, 360/236.8

See application file for complete search history.

(56) References Cited

U.S. PATENT DOCUMENTS 5,870,250 A * 2/1999 Bolasna et al. ........... 360/236.8
6,055,129 A * 4/2000 Park et al. ................ 360/236.1
6,989,965 B2 * 1/2006 Mundt et al. ............. 360/235.4
2003/0039073 A1 * 2/2003 Rao ........................ 360/235.8
2004/0264052 A1 * 12/2004 Mundt et al. ............. 360/236.1
2005/0280943 A1 * 12/2005 Inoue et al. .............. 360/236.2
2006/0238922 A1 * 10/2006 Hanyu ..................... 360/235.8

OTHER PUBLICATIONS

WebPage, excerpt of On-Line Dictionary, before 2004.*

* cited by examiner

*Primary Examiner*—Tianjie Chen

(57) ABSTRACT

An air bearing surface of a slider is described. In one embodiment, the air bearing surface comprises a center channel. The air bearing surface further comprises a plurality of side channels, wherein at least one side channel of the plurality of side channels is open to the center channel, and a plurality of pocket areas. The center channel, the plurality of side channels, and the plurality of pocket areas are configured to allow air to flow along the center channel toward the trailing edge of the ABS, such that a change in ambient pressure and a change and relative velocity of a head assembly with respect to a data storage medium of a data storage device would not significantly affect the fly height of a head assembly utilizing the ABS.

16 Claims, 3 Drawing Sheets

300

AIR BEARING WITH BOTH LOW ALTITUDE AND SPEED SENSITIVITIES

BACKGROUND

1. Technical Field

The present invention relates generally to head assemblies used in data storage devices, and more particularly to the air bearing surface on the slider affixed to the transducer suspension system.

2. Related Art

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computer system will generally not operate.

The basic hard disk drive model includes a storage disk or hard disk that spins at a designed rotational speed. In actuator arm is utilized to reach out over the disk. The arm carries a head assembly that has a magnetic read/write transducer or head for reading/writing information to or from a location on the disk. The transducer is attached to a slider, such as an air-bearing slider, which is supported adjacent to data surface of the disk by a cushion of air generated by the rotating disk. The transducer can also be attached to a contact-recording type slider. In either case, the slider is connected to the actuator arm by means of a suspension. The complete head assembly, e.g., the suspension and head, is called a head gimbal assembly (HGA).

In operation, the hard disk is rotated at a set speed via a spindle motor assembly having a central drive hub. Additionally, there are tracks evenly space at known intervals across the disk. When a request for a read of a specific portion or tract is received, the hard disk aligns the head, via the arm, over the specific track location and the head reads the information from the disk. In the same manner, when a request for a write of a specific portion or track is received, the hard disk aligns the head, via the arm, over to specific track location in the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

This continual reduction in size has placed steadily increasing demands on the technology used in the HGA, particularly in terms of power consumption, shock performance, and disk real estate utilization. One recent advance in technology has been the development of the femto slider, which is roughly one-third of the size and mass of the older Pico slider, which it replaces; over the past 23 years, slider size has been reduced by a factor of five, and mass by factor nearly 100.

These smaller sliders have substantially smaller surface areas, which increases the difficulties associated with achieving and maintaining a suitable fly height. With increasingly smaller sliders, concerns for speed and ambient pressure insensitivity also increase. Particularly, there is a need for enabling drives using femto sliders to be used in uncontrolled environmental conditions of varying hard disk rotational speeds and at differing altitude. However, it has proven very difficult to find an appropriate design for the air bearing surface of a slider that significantly meets the needs imposed by current demand.

SUMMARY

An air bearing surface of a slider is described. In one embodiment, the air bearing surface comprises a center channel. The air bearing surface further comprises a plurality of side channels, wherein at least one side channel of the plurality of side channels is open to the center channel, and a plurality of pocket areas. The center channel, the plurality of side channels, and the plurality of pocket areas are configured to allow air to flow along the center channel toward the trailing edge of the ABS, such that a change in ambient pressure and a change and relative velocity of a head assembly with respect to a data storage medium of a data storage device would not significantly affect the fly height of a head assembly utilizing the ABS.

DETAILED DESCRIPTION

A head assembly and a data recording device configured to use a head assembly are disclosed. Reference will now be made in detail to several embodiments of the invention. While the invention will be described in conjunction with the alternative embodiment(s), it will be understood that they are not intended to limit the invention to these embodiments. On the contrary, the invention is intended to cover alternatives, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of the ordinary skill in the art that the present invention may be practiced without these specific details. In other instances, well known methods, procedures, components, and circuits have not been described in detail as not to unnecessarily obscure aspects of the present invention.

Figure 1:
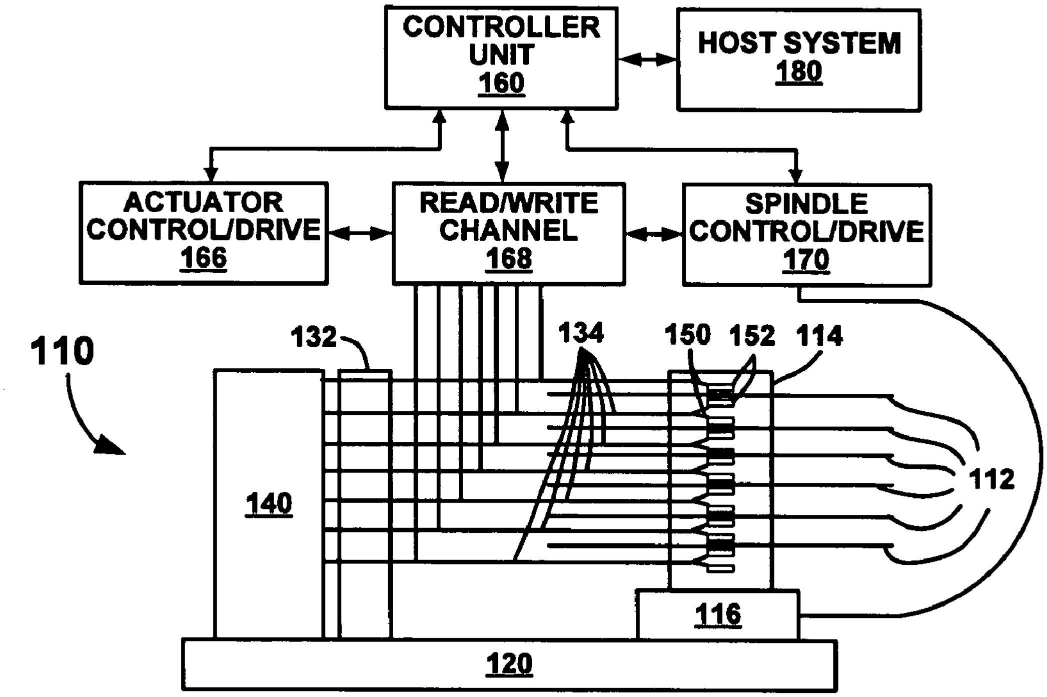
FIG. 1 is a side view of a hard disk drive and a controller unit in block form, in accordance with one embodiment of the present invention.
Figure 2:
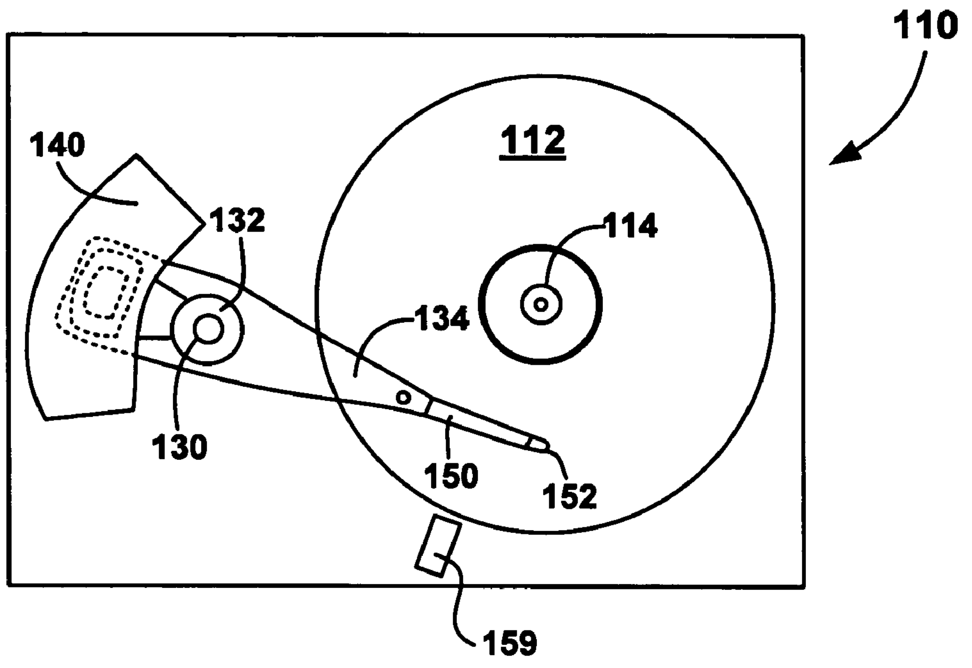
FIG. 2 is a top view of a hard disk drive system, in accordance with one embodiment of the present invention.

With reference now to FIGS. 1 and 2, a side view and a top view of a hard disk drive 110 are shown. Drive 110 has a disk pack having at least one media or magnetic disk 112, mounted to a spindle 114. A spindle motor 116 rotates the spindle 114 in the disk or disks 112. The spindle motor 114 and an actuator shaft 130 are attached to the chassis 120. A hub assembly 130 to rotates about the actuator shaft 130 and supports a plurality of actuator arms 134, referred to as a "comb." A rotary coil motor 140 is attached to the chassis 120 and to a rear portion of the actuator arms 134.

A plurality of suspension assemblies 150 are attached to the actuator arms 134. A plurality of transducer heads or sliders 152 are attached respectively to suspension assemblies 150. The sliders 152 are located proximate to the disks 112 for reading and writing. The rotary voice coil motor 140 rotates actuator arms 134 about the actuator shaft 130 in order to move to suspension assemblies 150 to the desired radial position on disks 112. The shafts 130, hub 132, arms 134, and motor 140 may be referred to collectively as a rotary actuator assembly.

A controller unit 160 provides overall control to system 110. Controller units 160 typically includes (not shown) a central processing unit (CPU), a memory unit and other digital circuitry, although it should be apparent that one skilled in the computer arts could also enable these aspects as hardware logic. Controller 160 is connected to an actuator control/drive unit 166 that in turn is connected to the rotary voice coil motor 140. This configuration allows controller 162 to control rotation of the disks 112. The host system 180, typically a computer system, is connected to the controller system 160. The whole system 180 may send digital data to the controller 160 to be stored on disks 112, or it may request that digital data at a specific location be read from a disks 112 sent to the system 180. The basic operation of DASD units is well known in the art and is described in more detail in The Magnetic Recording Handbook, C. Dennis Mee and Eric D. Daniel, McGraw-Hill Book Company, 1990.

Figure 3:
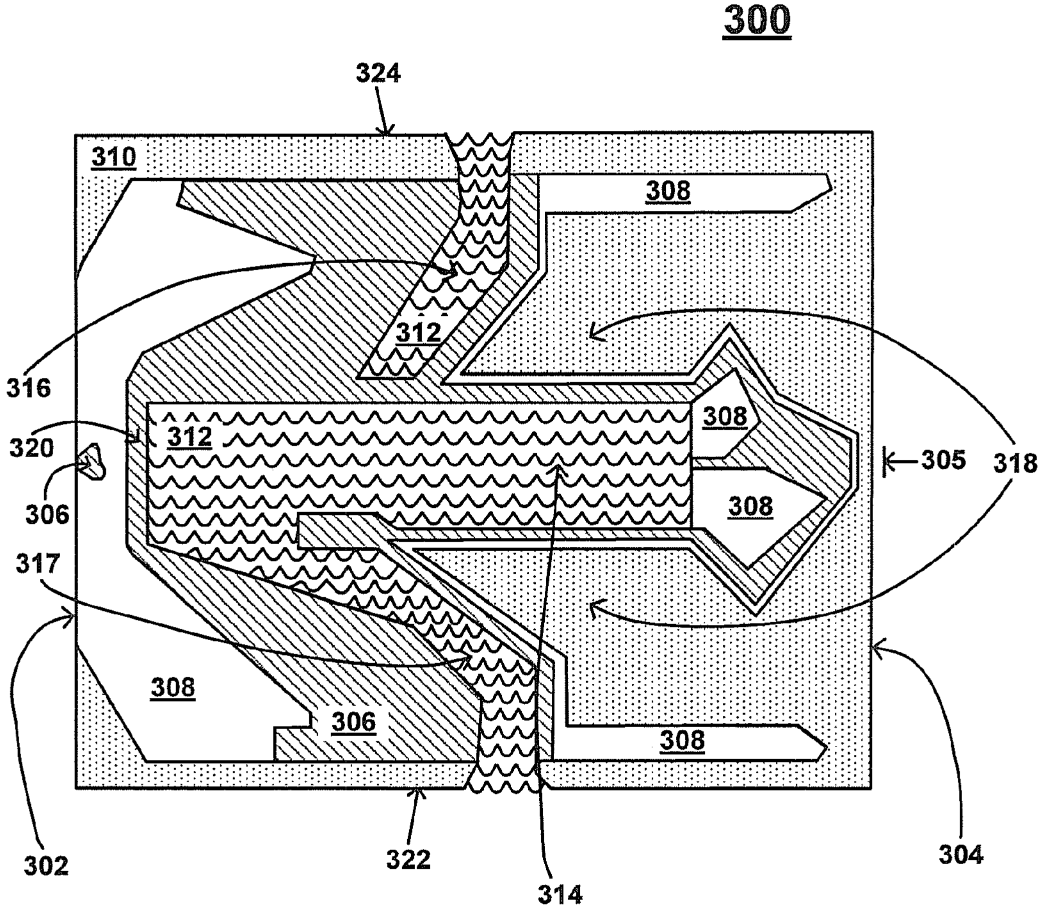
FIG. 3 is a top view of an air bearing surface of a slider, in accordance with one embodiment of the present invention.

Referring now to FIG. 3, FIG. 3 is a block diagram showing a top view of an air bearing surface (ABS) 300 of a slider, in accordance with one embodiment of the present invention. In FIG. 3, the present invention is described in the context of an example in which ABS 300 is implemented as including one center channel (e.g., 314), two side channels (e.g., 316 and 317), and two pocket areas (e.g., 318). This example can be readily extended to other components and/or numbers of components. Specifically, although detailed components and number of channels and/or pocket areas are disclosed in ABS 300, such components and number of channels and/or pocket areas are exemplary. That is, embodiments of the present invention are well suited to having various number of other additional components or variations of components recited in ABS 300.

In reference now to FIG. 3, ABS 300, in this embodiment, is created via a known 3-etch process. Various etching techniques can be used to achieve desired depths of etching. Such varying techniques include, but are not limited to, for example, reactive ion etching (RIE), ion milling (IM), and other various techniques well known in the art. In addition, although the present embodiment utilizes a combination of 3 etch depths of –0.15/0.5/2.8 micrometer (um), a different combination of etch depths may be used. Furthermore, a different number of etch process may also be used.

Referring back now to FIG. 3, the surface of the ABS is etched down to a first depth of 0.15 um, leaving behind only selected surfaces, shown in a diagonally striped pattern, hereinafter described as surface level 306. Surface level 306 is the original ABS surface that has not been etched. After the first etching, the first depth is then further etched to leave behind only selected surface features depicted by un-patterned areas (hereinafter described as surface level 308). Because the first etching is 0.15 μm deep, surface level of 308 is 0.15 μm below surface level 306. The second depth is again further etched to leave behind only selected surface feature depicted by a dotted pattern (hereinafter described as surface level 310). Because the second etching is 0.5 μm deep, as a result, the surface level 310 is 0.65 μm below surface level 306. Finally, the third etch is 2.8 micrometers deep and results in a surface 314. The resulting surface 312, shown in a wave-like pattern, is 3.45 micrometers below surface level 306. The number of etchings in the depth of each was selected for convenience, to conform to a process for creating an already-existing slider.

Other embodiments of the present invention use different numbers of etchings, and different depths for the etchings.

Referring to FIG. 3, ABS 300, in this embodiment, has a leading edge (LE) 302, and a trailing edge (TE) 304. In this example, ABS also has an inner diameter (ID) side 322 and an outer diameter side (OD) 322. When incorporated into a hard drive or other data storage device, a transducer or other read element is mounted at TE 304, at point 305. ABS 300 also includes, in this embodiment, center channel 314, which is created by the third etching. Other embodiments use multiple center channels. Any one or more etching process may be used to create a center channel, or multiple center channels. Furthermore, the transducer or other read element may be mounted at a point that is not depicted by point 305.

In further reference to FIG. 3, ABS 300, in this embodiment, further includes two side channels (e.g., 316 and 317) and two pocket areas (e.g., 318). One of the side channels is located on the OD side of the center channel and is referred to hereinafter as side channel 316. Another of the side channels is located on the ID side of the center channel and is referred to hereinafter as side channel 317. In this example, the side channel 316 is sealed from the center channel 314, so that the side channel 316 is not open to the center channel 314. Specifically, surface 306 acts as a barrier between side channel 316 and center channel 314 so that the walls of side channel 316 do not merge into the walls of the center channel 314. On the other hand, side channel 317 is open to the center channel 314. This means no surface(s) (e.g., surface 306) act(s) as a barrier or separator between one end of side channel 317 and a portion of the center channel 314. More specifically, the walls of the side channel 317 merge into the walls of the center channel 314. In addition, the side channel 317, in this embodiment, is narrower than the side channel 316 to allow unnecessary air flow to exit when the slider is facing faster OD flow. The side channels 316 and 317 are thusly designed to accommodate the different air speed from ID to OD and to allow weak ID air flow to be directed to the trailing edge as much as possible. In another embodiment, ABS 300 may include a different number of side channels. The side channels may also be of equal or unequal size and/or width.

Still in reference to FIG. 3, in this embodiment, the depths of side channels (e.g., 316 and 317) and the depth of the center channel 314 are the same at 3.45 micrometers. In the present embodiment, the deep depth of the side channels also acts to reset pressure by bringing crown sensitivity closer to zero so that the crown of the slider does not significantly affect the fly height. In other words, the deep depth of the side channels acts to reset pressure so that there is low crown sensitivity. In effect, the deep side channels cause the air pressure of the air bearing to be split into independent parts, with near atmospheric pressure in the center. The depth of the side channels 316 and 317 may be different from the depth of the center channel 314. The side channels 316 may also have a different depth from the side channel 317.

In the present embodiment, in reference to FIG. 3, there are also two pocket areas toward the TE of the ABS 300 for roll stiffness of the ABS. These pocket areas are hereinafter referred to as pocket areas 318. In the present embodiment, one of the pocket areas is located to the ID side of the center channel 314, while another of the pocket areas is located to the OD side of the center channel 314. In this embodiment, pocket areas 318 are part of the surface area 310. In this embodiment, pocket areas 318 form two negative pressure pockets of suction force. In other embodiments, the pocket areas 318 include a surface of a different depth from surface 310. The pocket areas 318 may include various surfaces. In one embodiment, there may be only one pocket area. In addition, pocket areas 318 may be located in a different position.

Still in reference to FIG. 3, in the present embodiment, the center channel 314, the side channels 316 and 317, and the pocket areas 318 are angularly shaped to achieve good fly height sigmas. In another embodiment, the center channel and the side channels are angularly shaped, while the pocket areas are not angularly shaped. In the present embodiment, ABS 300 further includes a crossbar 320 that may implemented to block particles from entering the air bearing. In the present embodiment, the crossbar 320 is formed by the surface 306 located between the surface 308 and the center channel 314 toward the leading edge (LE). In other embodiments, the crossbar 320 is formed by other surfaces aside from surface 306. The crossbar may also be located in a different position proximate to the center channel 314. In yet another embodiment, there is no crossbar 320 of the ABS 300.

Conventionally, mobile drive customers are more interested in femto form ABS due to functionality concerns of a mobile drive, such as energy cost and real estate. However, it is particularly hard to design a femto form ABS to perform like a pico form ABS or a femto-L form ABS since the significantly smaller size of the femto form ABS allows much less air in than the pico or the femto-L form. In addition, generally, when an ABS is designed for improved altitude sensitivity, the speed sensitivity worsens and vice versa.

By having a deep center channel, a sealed OD side channel, a smaller connected ID side channel, ABS 300 allows unnecessary air flow to exit when the slider is facing faster OD air flow and accommodate different air speed from ID to OD. This allows ABS 300 to minimize speed sensitivity. For example, when the depth of the center channel and side channels is near 3.45 um, the slider can fly at almost the same height at both 4200 revolutions per minute (rpm) and 5400 rpm with less than a 0.5 nanometer (nm) difference. In addition, ABS 300 provides low altitude sensitivity. In one embodiment, two negative pressure pockets create a suction force allowing ABS 300 to have satisfactory roll stiffness so that altitude sensitivity is minimized. Additionally, the relative position of the suction force toward the TE of the ABS 300 provides a correct momentum to the total force balance so that fly height (FH) sensitivity at high altitudes is further minimized. For example, when choosing the depth 0.65 um for the pocket areas, for every ten thousand feet of altitude change, ABS 300 has altitude loss of only about 0.6 nm. Moreover, the fairly shallow depth of 0.65 um of the pocket areas 318, in one embodiment, does not significantly affect the speed sensitivity of the ABS 300 so that the two problems of the altitude sensitivity and speed sensitivity are separated. Furthermore, the deep side channels resets pressure so that there is almost no crown sensitivity. Thus, by having a deep center channel, a sealed OD side channel, a smaller ID side channel, and two negative pocket areas, this ABS design provides minimal fly height sigma, low altitude sensitivity, low speed sensitivity, and decreased crown sensitivity for various form factors, including femto form.

Embodiments of the present invention described above thus relate at least to a personal portable storage devices as well as a hard disk apparatus configured for use as a personal portable storage device. While the present invention has been described in particular exemplary embodiments, the present invention should not be construed as limited by such embodiments, but rather construed according to the following claims and their equivalents.

What is claimed:

1. An air bearing surface (ABS) of a slider, said ABS comprising:

a center channel;

a plurality of side channels, wherein at least one side channel of said plurality of side channels is open to said center channel and one of said plurality of side channels is not open to said center channel;

a plurality of pocket areas, wherein said center channel, said plurality of side channels, and said plurality of pocket areas are configured to allow air to flow along said center channel toward the trailing edge (TE) of said ABS, such that a change in ambient pressure and a change in relative velocity of a head assembly with respect to a data storage medium of a data storage device will not significantly affect the fly height (FH) of said head assembly utilizing said ABS.

2. The ABS of claim 1, further comprising:

a crossbar located proximate to the leading edge (LE).

3. The ABS of claim 1, wherein said ABS is comprised of a first etched surface, a second etched surface, and a third etched surface, and wherein said first etched surface, said second etched surface, and said third etched surface each defines a different depth.

4. The ABS of claim 1, wherein said center channel and said plurality of side channels each have a depth which is determined by an intended disk rotation speed and an intended FH.

5. The ABS of claim 1, wherein a first of said plurality of side channels is located proximate to the inner diameter (ID) of said center channel, wherein a second of said plurality of side channels is located proximate to the outer diameter (GD) of said center channel, and wherein said first of said plurality of side channels defines less volume than said second of said plurality of side channels.

6. The ABS of claim 1, wherein at least one of said plurality of pocket areas is located proximate to the TE, and wherein said at least one of said plurality of pocket areas is configured to create a negative pressure pocket to increase roll stiffness of said ABS.

7. the ABS of claim 1, wherein said center channel, said plurality of side channels, and said plurality of pocket areas are each angularly shaped.

8. A data recording device comprising:

a disk with a data surface of concentric data tracks;

a rotator for rotating said disk about an axis generally perpendicular to the disk;

a slider maintained in operative relationship with the data surface when the disk is rotating, said slider having an air bearing surface (ABS), said ABS comprising:

a center channel;

a plurality of side channels, wherein at least one side channel of said plurality of side channels is open to said center channel and one of said plurality of side channels is not open to said center channel;

a plurality of pocket areas, wherein said center channel, said plurality of side channels, and said plurality of pocket areas are configured to allow air to flow along said center channel toward the trailing edge (TE) of said ABS, such that a change in ambient pressure and a change in relative velocity of a head assembly with respect to a data storage medium of a data storage device will not significantly affect the fly height (FH) of said head assembly utilizing said ABS;

a transducer attached to said slider for reading data from and writing data to the data surface;

an actuator for moving said slider generally radially to the disk to allow the transducer to access the data tracks; and an electronic module for processing data read from and written to the data surface.

9. The data recording device of claim 8, further comprising:

a crossbar located proximate to the leading edge (LE) of said ABS.

10. The data recording device of claim 8, wherein said ABS is comprised of a first etched surface, a second etched surface, and a third etched surface, and wherein said first etched surface, said second etched surface, and said third etched surface each defines a different depth.

11. The data recording device of claim 8, wherein said center channel and said plurality of side channels each have a depth which is determined by an intended disk rotation speed and an intended FH.

12. The data recording device of claim 8, wherein a first of said plurality of side channels is located proximate to the inner diameter (ID) of said center channel, wherein a second of said plurality of side channels is located proximate to the outer diameter (OD) of said center channel, and wherein said first of said plurality of side channels defines less volume than said second of said plurality of side channels.

13. The data recording device of claim 8, wherein at least one of said plurality of pocket areas is located proximate to the TE, and wherein said at least one of said plurality of pocket areas is configured to create a negative pressure pocket to increase roll stiffness of said ABS.

14. The data recording device of claim 8, wherein said center channel, said plurality of side channels, and said plurality of pocket areas are each angularly shaped.

15. An air bearing surface (ABS) of a slider, said ABS comprising:

a means for defining a center channel;

a means for defining a plurality of side channels, wherein at least one side channel of said plurality of side channels is open to said center channel and one of said plurality of side channels is not open to said center channel;

means for defining a plurality of pocket areas, wherein said center channel, said plurality of side channels, and said plurality of pocket areas are configured to allow air to flow along said center channel toward the trailing edge (TE) of said ABS, such that a change in ambient pressure and a change in relative velocity of a head assembly with respect to a data storage medium of a data storage device will not significantly affect the fly height (FH) of said head assembly utilizing said ABS.

16. The ABS of claim 15, further comprising:

means for defining a crossbar located proximate to the leading edge (LE).

* * * * *

UNITED STATES PATENT AND TRADEMARK OFFICE

CERTIFICATE OF CORRECTION

PATENT NO. : 7,583,473 B2 
APPLICATION NO. : 11/495070
DATED : September 1, 2009
INVENTOR(S) : Bolasna et al.

It is certified that error appears in the above-identified patent and that said Letters Patent is hereby corrected as shown below:

Col. 6, Claim 5, Line 32: delete "GD"
and insert -- OD --

Signed and Sealed this

Sixteenth Day of February, 2010

David J. Kappos

David J. Kappos
*Director of the United States Patent and Trademark Office*

UNITED STATES PATENT AND TRADEMARK OFFICE
CERTIFICATE OF CORRECTION

PATENT NO. : 7,583,473 B2
APPLICATION NO. : 11/495070
DATED : September 1, 2009
INVENTOR(S) : Bolasna et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 404 days.

Signed and Sealed this

Fourteenth Day of September, 2010

David J. Kappos
*Director of the United States Patent and Trademark Office*